United States Patent
Li

(10) Patent No.: US 9,537,592 B2
(45) Date of Patent: Jan. 3, 2017

(54) SYSTEMS AND METHODS FOR SYNCHING A HOST COMPUTER WITH A VARIETY OF EXTERNAL DEVICES

(71) Applicant: Meggitt Training Systems, Inc., Suwanee, GA (US)

(72) Inventor: Wen Li, Alpharetta, GA (US)

(73) Assignee: MEGGITT TRAINING SYSTEMS, INC., Suwanee, GA (US)

( * ) Notice: Subject to any disclaimer, the term of this patent is extended or adjusted under 35 U.S.C. 154(b) by 0 days.

(21) Appl. No.: 14/924,642

(22) Filed: Oct. 27, 2015

(65) Prior Publication Data

US 2016/0127117 A1    May 5, 2016

Related U.S. Application Data

(60) Provisional application No. 62/072,287, filed on Oct. 29, 2014.

(51) Int. Cl.
*H04L 7/04* (2006.01)
*H04J 3/06* (2006.01)
*G06F 1/14* (2006.01)

(52) U.S. Cl.
CPC .............. *H04J 3/0667* (2013.01); *G06F 1/14* (2013.01)

(58) Field of Classification Search
CPC .................................. H04L 7/04; H04L 7/0075
USPC ......................................................... 375/362
See application file for complete search history.

(56) References Cited

U.S. PATENT DOCUMENTS

2013/0013811 A1* 1/2013 Liu .......................... G06F 1/14
709/248

OTHER PUBLICATIONS

Kay Romer, Time Synchronization and Calibration in Wireless Sensor Networks, Handbook of Sensor Networks Algorithms and Architectures, John Wiley & Sons, Hoboken, NJ, USA, Sep. 23, 205, p. 199-237.*

* cited by examiner

*Primary Examiner* — Tanmay Shah
(74) *Attorney, Agent, or Firm* — Hackler Daghighian Martino & Novak

(57) ABSTRACT

A method of calculating the difference between a device clock and a host clock over a communication network is provided. In a preferred embodiment, the method comprises: a.) sending a sync requests over the communication network; b.) storing in memory a sent host time $T_H0$ when the sync requests was sent; c.) receiving a local time report over a communication network from a local device; d.) storing in memory a device local time X extracted from the local time report; e.) storing in memory a receive host time $T_H3$ when the local time report was received; f.) calculating T such that $T=(T_H0+T_H3)/2$; repeating steps a through f a plurality of times; and calculating coefficients Ai and Bi using linear regression after repeating steps a through f at least twice where $X=Ai*T+Bi$.

18 Claims, 3 Drawing Sheets

SYSTEMS AND METHODS FOR SYNCHING A HOST COMPUTER WITH A VARIETY OF EXTERNAL DEVICES

CROSS-REFERENCE TO RELATED APPLICATION

This application claims the benefit of U.S. Provisional Application No. 62/072,287, filed Oct. 29, 2014 which is incorporated herein by reference.

FIELD

The present patent document relates to methods and systems for syncing devices communicating over a network. In particular, this patent document relates to systems and methods that sync a host computer and a variety of external devices in real time. Background In a typical system that includes a plurality of devices communicating over a network, there is often a need for the devices to share a common clock. That is, it is often important for the clock on one device to be synced, or synced as close as possible, with the clocks on the other devices. In some systems, the devices may all be computers with built-in clocks that behave similarly. However, other systems may include a host computer and multiple external devices, which have totally different hardware and internal structures. In cases where the external devices have clocks that cannot be modified, reset or offset, the traditional clock syncing algorithms, such as Network Time Protocol (NTP), may not be practical.

The devices communicating over the network may do so using any number of different hardware and software schemes including for example, Ethernet. Many of these communication schemes support data transfer between the host and an external device, but the time required for data transfer is not predictable. In many network communication schemes, such as Ethernet for example, the time for the same size data transfer may be different for a number of reasons, including random events.

It would be beneficial to have a timer system that could allow the host computer and external devices to be synced with a sync tolerance less than a couple of milliseconds. It would be beneficial if such systems and methods considered that the timers on the host and external devices may have very different behaviors. In addition, the host and external devices may have different hardware, time counting systems, and references. It would also be preferable if the sync mechanism was fast enough for real time performance such that clocks on two devices could be synced to each other in a couple seconds and with millisecond level tolerance.

SUMMARY OF THE EMBODIMENTS

In view of the foregoing, an object according to one aspect of the present patent document is to provide methods and systems for syncing the timers of numerous devices on a network. Preferably the methods and apparatuses sync timers on the various devices and address, or at least ameliorate one or more of the problems described above. To this end, a method of syncing multiple devices on a communication network is provided. In a preferred embodiment, the method comprises: sending a plurality of sync requests over the communication network; for each sync request, storing in memory a sent host time $T_H0$ when the sync request was sent; receiving from a local device a plurality of local time reports over the communication network; for each local time report, storing in memory a receive host time $T_H3$ when the local time report was received; calculating T such that $T=(T_H0+T_H3)/2$ for a plurality of sent host times and their corresponding receive host times; for each local time report, storing in memory a device local time X extracted from the local time report; and calculating coefficients Ai and Bi using linear regression after calculating T from at least two host times and their corresponding receive host times where $X=Ai*T+Bi$.

Once coefficients Ai and Bi are known, they may be sent to the local device so that the local device can convert between its local time and host time. In a similar manner, the host can use coefficients Ai and Bi to convert its local host time to local device time or vice versa. For example, the host could calculate a time on the local device from a host time by multiplying the host time by Ai and adding Bi. As another example, the host could calculate a host time that an event measured by the device occurred by taking a local device time and subtracting Bi and dividing the result by Ai. Similar conversions may be performed by a local device once Ai and Bi have been obtained.

The methods described herein can support numerous different types of clocks including those that use CPU ticks or CPU cycles. Moreover, the methods are compatible with more conventions clocks that measure time in seconds.

In preferred embodiments, the method of least squares is used as the linear regression method. However, as discussed in more detail below, other linear regression methods may be used.

In some embodiments, noise that may occur in Ai and Bi may be reduced by applying a filter. In preferred embodiments that use a filter, a low pass filter is used.

In other embodiments of the method of syncing a device clock over a communication network, the methods comprise: a.) sending a sync requests over the communication network; b.) storing in memory a sent host time $T_H0$ when the sync requests was sent; c.) receiving a local time report over a communication network from a local device; d.) storing in memory a device local time X extracted from the local time report; e.) storing in memory a receive host time $T_H3$ when the local time report was received; f.) calculating T such that $T=(T_H0+T_H3)/2$; repeating steps a through f a plurality of times; and calculating coefficients Ai and Bi using linear regression after repeating steps a through f at least twice where $X=Ai*T+Bi$.

As described more fully below, systems and methods for syncing multiple devices on a communication network are provided. Further aspects, objects, desirable features, and advantages of the apparatus and methods disclosed herein will be better understood from the detailed description and drawings that follow in which various embodiments are illustrated by way of example. It is to be expressly understood, however, that the drawings are for the purpose of illustration only and are not intended as a definition of the limits of the claimed invention.

DETAILED DESCRIPTION OF THE EMBODIMENTS

Figure 1:
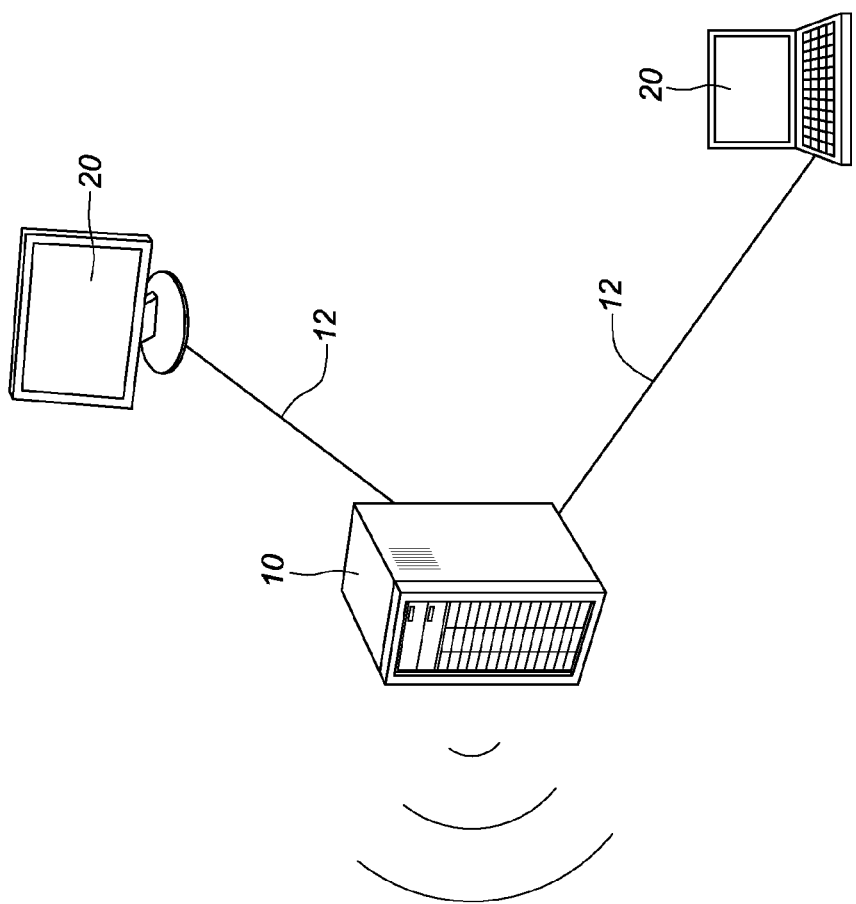
FIG. 1 illustrates a host and a plurality of devices connected by a communication network.
Figure 1:

The following detailed description includes representative examples utilizing numerous features and teachings, both separately and in combination, and describes numerous embodiments in further detail with reference to the attached drawings. This detailed description is merely intended to teach a person of skill in the art further details for practicing preferred aspects of the present teachings and is not intended to limit the scope of the claims. Therefore, combinations of features disclosed in the following detailed description may not be necessary to practice the teachings in the broadest sense, and are instead taught merely to describe particularly representative examples of the present teachings.

Some portions of the detailed descriptions that follow are presented in terms of algorithms and sequences of operations which are performed within a computer memory. These algorithmic descriptions and representations are the means used by those skilled in the data processing arts to most effectively convey the substance of their work to others skilled in the art. An algorithm or sequence of operations is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing," "computing," "calculating," "determining," "displaying" or the like, refer to the action and processes of a computer system, or similar electronic device, that manipulates and transforms data represented as physical (electronic) quantities within the computer system's registers and memories into other data similarly represented as physical quantities within the electronic device's memory or registers or other such information storage, transmission or display devices.

The embodiments disclosed also relate to an apparatus for performing the operations herein. This apparatus may be specially constructed for the required purposes, or it may comprise a general purpose processor selectively activated or reconfigured by a computer program stored in the electronic device. Such a computer program may be stored in a computer readable storage medium, such as, but is not limited to, any type of disk, including floppy disks, optical disks, CD-ROMs, and magnetic-optical disks, read-only memories (ROMs), random access memories (RAMs), EPROMs, EEPROMs, Flash memory, magnetic or optical cards, or any type of media suitable for storing electronic instructions, and each coupled to a computer system bus.

The algorithms presented herein are not inherently related to any particular electronic device or other apparatus. Various general purpose systems may be used with programs in accordance with the teachings herein, or it may prove convenient to construct a more specialized apparatus to perform the required method steps. The required structure for a variety of these systems will appear from the description below. It will be appreciated that a variety of programming languages may be used to implement the teachings of the embodiments as described herein.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of original disclosure, as well as for the purpose of restricting the claimed subject matter. It is also expressly noted that the dimensions and the shapes of the components shown in the figures are designed to help understand how the present teachings are practiced, but not intended to limit the dimensions and the shapes shown in the examples.

The following is a description of various embodiments of methods for syncing devices on a communication network. In the description provided, the words "clock" and "timer" are used interchangeably and include any method of tracking time. Most traditional CPU's have what we would think of as a clock because it keeps track of time in seconds. However, some devices without sophisticated processors may keep track of time using CPU tick time or CPU count. In these types of devices, time is not expressed in seconds or some derivative of seconds but rather clock cycles. When either of the words "timer" or "clock" is used herein, it may refer to any type of timer/clock whether it keeps track of time in seconds, some derivative of seconds, CPU ticks, CPU count, CPU cycles or any other type of periodic quantity.

FIG. 1 illustrates a plurality of devices connected by a communication network. As may be seen in FIG. 1, a host 10 may be connected via cables 12 to some devices 20 and may be wireless connected to other devices 20. As used herein, a host 10 may also be referred to as a server and a device 20 may also be referred to as a client.

Figure 2:
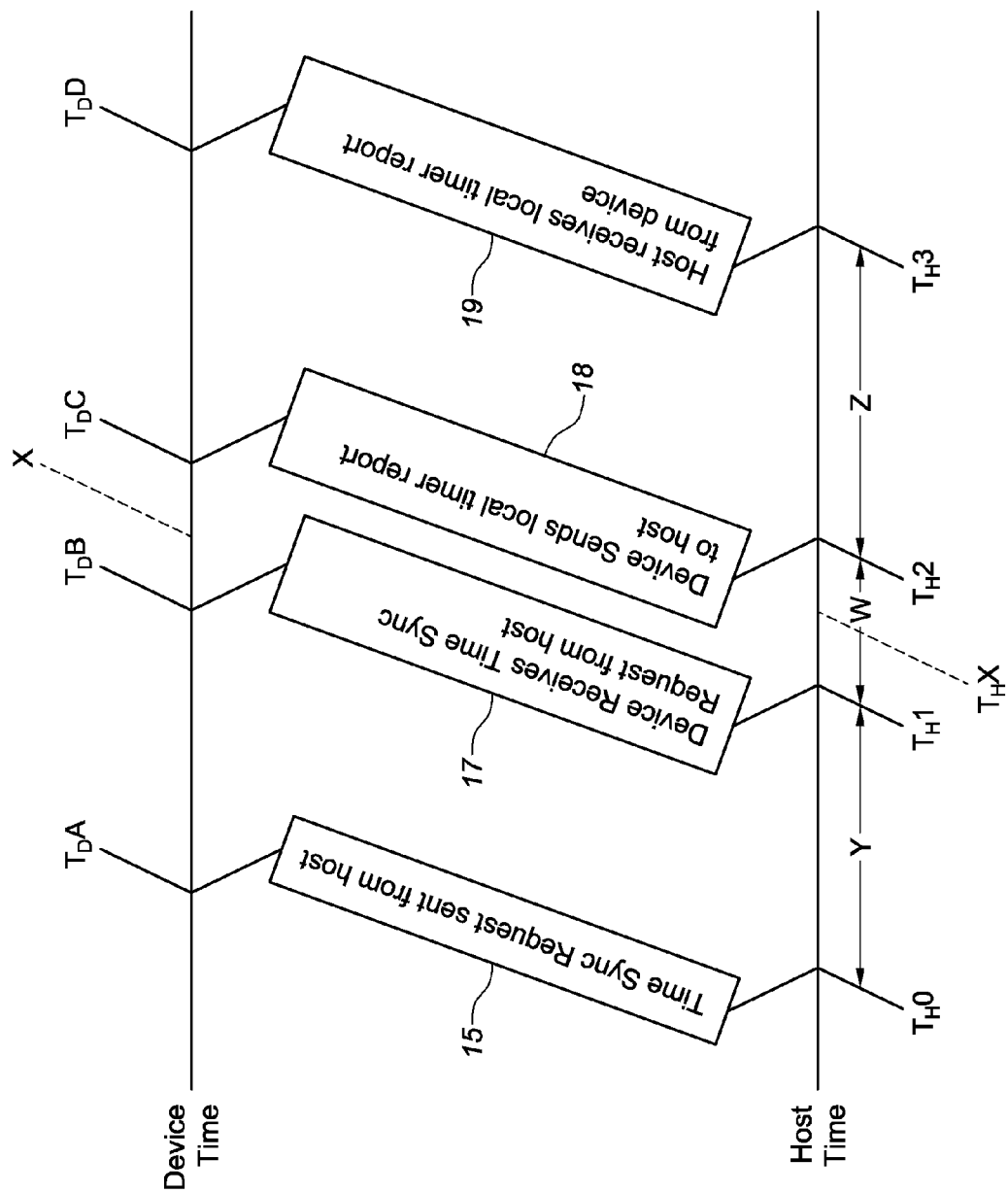
FIG. 2 illustrates a timeline of events for syncing a host and an external device.

FIG. 2 illustrates a series of events that occur with the host local timeline on the bottom and the device local time shown on the timeline above the events. While the events occur at the same moment in global time, the events can occur at different local times on the host 10 and device 20. Moreover, the local time on the host 10 and device 20 may be in different units, update rates, or may have started at different $T_0$ global times.

At time $T_H0$ on the timer of the host 10, the host 10 sends a timer sync request 15 to a client device 20. $T_H0$ corresponds to some local time on the device $T_DA$. Although the event happens at a single global time, it is represented as $T_H0$ and $T_DA$ to show that the two local clocks may not have the same zero time, units, or update rates and thus, likely record the same global time as a different local time. At this point in the algorithm, $T_DA$ is unknown to the host 10. In a preferred embodiment, the request includes a request ID to identify the request.

The sync request 15 takes some random amount of time Y to get from the host 10 to the device 20. The value Y is a time delta and not an absolute time. However, even though Y is a time delta, the measured values of Y may not be exactly the same on the host and devices, even though the difference may be very small. The reason is because different clocks will have different levels of accuracy. One advantage of the embodiments disclosed herein, as will be explained in more detail below, is that even these variations in accuracy may be compensated for. As will be shown in more detail below, the embodiments disclosed herein may provide a coefficient labelled A that provides compensation even for differences in the level of accuracy of different clocks.

The device 20 receives the request 15 at device local time $T_DB$ and begins processing the request. The processing of the request takes some time W. During processing of the request, the device 20 reports the device local time value as X to the host 10. From the host's perspective, the time value X reported by the device 20 corresponds to some time on the host $T_HX$, which is unknown at this point in the algorithm. The value and units of X depend on the behavior of the individual device 20 and may not be in the same units as the host time. The device local timer report 18 is sent from the device 20 back to the host 10 at device time $T_DC$, reporting the local time on the device as X. In a preferred embodiment, the device local time report 18 includes the request ID allowing the host to identify which request the response is associated with. The device local timer report 18 takes some amount of time Z to get from the device 20 to the host 10. In most networks, the amount of time Z will be random and will not necessarily be equal to Y. Z is also a time delta and is therefore, like Y, equal in each reference system although maybe in different units.

Accordingly, the host 10 receives the report 18 from the device 20 at host local time $T_H3$. $T_H3=T_H0+Y+W+Z$. Here W is a period of time used for the device 20 to process the request 15 from the host 10 and generate a report to the host 10. The local time value X is a certain moment during time period W.

Once the host 10 receives the report 18 form the device 20, the host 10 may begin to collect time samples that may be used for calculating conversion factors between the time value on the host 10 and the time on the device 20. In a preferred embodiment, the sample point collected by the host 10 includes two values T and X. The first value T is the host time and the second value X is the device time. The host time T is calculated by averaging the two host time stamps $T_H$ such that T is $T=(T_H0+T_H3)/2$. Note, $T_H1$ and $T_H2$ although shown in FIG. 2 are unknown to the host 10. The host only knows when it sends the time sync request 15 and when it receives the local timer report 19, which are $T_H0$ and $T_H3$ respectively. The device time X is the time stamp sent by the device 20 and received by the host 10 in the device local timer report 18.

The process of sending out sync requests 15 and receiving local timer reports 18 may be repeated a plurality of times to collect a series of samples containing T and X. The series of samples T and X may be represented as (Ti, Xi), where i is an integer from 1 to n and n is the number of samples.

A relationship may then be constructed between T and X using the series of samples (Ti, Xi). In a preferred embodiment, it is assumed that the relationship between T and X is a linear relationship and linear regression is used to build this linear relationship using the series (Ti, Xi). The time on the device may be expressed in terms of the time on the host by the equation $X=Ai*T+Bi$ where Ai and Bi are coefficients found from the linear regression calculation after sample i is collected In a preferred embodiment, any type of mathematical analysis may be used to calculate the coefficients Ai and Bi from the series (Ti, Xi). In a preferred embodiment, linear regression is used and in an even more preferred embodiment, the least squares method may be used. However in other embodiments other methods of calculating Ai and Bi from the series (Ti, Xi) may be used. For example, simple regression or polynomial regression may be used. In other embodiments, ridge regression or LASSO may be used. In yet other embodiments, other methods of determining Ai and Bi from (Ti, Xi) may be used but preferably, the method assumes Ai and Bi depend linearly from the series (Ti, Xi).

The coefficients Ai and Bi may begin being calculated after any number of samples i greater than or equal to 2 have been collected. In a preferred embodiment, coefficients Ai and Bi begin being calculated once two samples are collected. However, in other embodiments, more samples may be used. Although the total number of samples will steadily increase as the algorithm runs, not all the samples are necessarily used. In a preferred embodiment, there is a pre-defined maximum number of samples m used for calculating coefficients Ai and Bi. When i is less than or equal to m, all available samples may be used. When i is greater than m, only the last m samples are used. In yet other embodiments, when additional samples are present, the samples may be sorted or filtered in any number of ways to pre-select the samples that will be used for calculating coefficients Ai and Bi.

In a preferred embodiment, the noise in Ai and Bi may be reduced by using a low-pass filter (LPF) algorithm. The LPF algorithm filters out the high frequency noise. Because the standard timer signal in both the host computer and the device are typically based on a quartz crystal oscillator, the signals should be very stable. Theoretically, the frequency of A and B should be very low, close to zero, which imply A and B should be close to constants.

The coefficients A and B are used as conversion factors between the time on the host computer and the time on an external device. For any moment T on the host computer, the time X on the device may be calculated as $X=A*T+B$. In addition, at any moment X on the device, the time on the host may be calculated as $T=(X-B)/A$.

One common method for syncing the clocks of numerous computers on a communication network is known as Network Time Protocol (NTP). In NTP the algorithms are designed to sync two fully functional clocks on separate equipment, in which the time count schemes are the same. For example, both of them use second or millisecond as their base time unit. In contrast, the embodiments disclosed herein are designed to work not only with general computers which have a fully functional clock, but also with external devices, which may have different time count schemes. Examples of external devices may include but are not limited to devices including a processor chip designed for a specific function, for example, digital cameras, digital controllers, etc.

In order to be more flexible than traditional time sync algorithms, the methods and systems disclosed herein do not assume there is a standard clock timer in both synced ends that uses "seconds" as the basic count unit such that time data is either a multiple of a second or a fraction of a second. Instead, the embodiments disclosed herein may directly use the processor chip time stamp count for the time unit. Since most external devices do not have a standard clock timer, it is important to be able to use the processor chip time stamp count as the time unit.

One advantage of the methods and systems disclosed herein is that they support syncing multiple clocks each running in a different time count system. Traditional algorithms only sync clocks running in the same time count system. The traditional algorithm assumes the difference between two clocks is an offset only. For example, the traditional algorithm may assume Clock T1 is slower than Clock T2 by 3.253 seconds. Accordingly, Clock T1 and T2 will only be different by 3.253 seconds. In contrast, the methods and systems taught herein create a linear relation between two non-traditional clock counts. To express the difference, in addition to the offset parameter B, there is also a scale coefficient A.

Traditional algorithms adjust the clock in the client device to match the clock in the server or host computer. The adjustment costs resources on the client device CPU and may have side effects on some of the running applications while the adjustment is being made. Moreover, adjusting the clock in the client device may not always be feasible. For example, where the client device is a non-standard computer, it may not be possible to adjust the clock or timer. The preferred embodiments disclosed herein may alleviate this problem by not requiring adjustment on the client side. In preferred embodiments, the client clock or timer always runs as initially set. Instead of changing the client side, the time sync is performed by real time conversion. Both the host and the client side know how to convert their local time into the local time of the other side, even if the two devices are using different time systems. Accordingly, in a preferred embodiment, the host 10 may communicate to the device 20 the coefficients Ai and Bi once they are calculated. This allows the device 20 to also convert its local clock into the host time. In an even more preferred embodiment, the host sends periodic updates of the coefficients Ai and Bi to the device 20.

In order to sync the clocks to the millisecond level tolerance, many traditional algorithms may take several hours or even days. However, the preferred embodiments described herein are capable of syncing to the millisecond level tolerance in anywhere from seconds to a couple minutes.

Another advantage of the embodiments disclosed herein is related to the sync error. In traditional systems, if the host or client clock has a physical error, for example a base frequency drifting from an ideal value, the sync error will gradually increase as time elapses from the previous sync point. The preferred embodiments of the current patent document may avoid this sync drift. In the preferred embodiments disclosed herein, errors like those caused by a base frequency shift in a clock in either the host or the device or both are compensated for by the parameter A. Accordingly, sync error may be much smaller. In particular, the sync errors may be much smaller as the time elapsed from the previous sync point increases.

Although the embodiments described herein may be used with any type of network, in preferred embodiments, the embodiments are used in a small scale network for more efficiency. However, the embodiments disclosed herein are not limited to small scale networks and may be used on any size network. In one embodiment, a timer/clock in Atlanta was synced over the Internet with a timer/clock in Singapore, using the techniques described herein.

Embodiments disclosed herein use a more sophisticated solution to time sync than the typical one value offset used by traditional systems. In preferred embodiments, the time synchronization is calculated using two independent values, a scale parameter A and an offset parameter B, which provide the offset and scaling between the server local clock and the client local clock or timer.

One advantage of using both a scale parameter A and an offset parameter B is that A is a function of the server frequency (noted as fs) and client frequency (noted as fc). In real life, even they are stable, fc and fs are still very slowly changing their values as time elapses because of a lot of reasons, such as temperature, etc., which results in a time drift after two timers are synced initially. Without scale parameter A, even fs and fc are pre-adjusted A=1, the solution may be good at any instantaneous moment but not guaranteed good a couple hours later.

Most traditional network time synchronization works in large scale time stamps. Large scale as used herein means a resolution of around one second or more. As one example, traditional network time synchronization methods may be able to sync all the clocks on different machines on the network to within a one second time tolerance. A resolution of one second is adequate for most daily business operations such as email, database, file management, etc. However, traditional time synchronization techniques may not provide the level of precision needed for many systems that require less than one second precision in time synchronization. One potential solution to achieve more precise synchronization between clocks in a system is to connect the devices with a hardware sync wire. The electric sync pulse in the sync wire triggers all the clocks connected to wire to update their local time value. Using a hardware sync wire may provide sync resolution in the $10^{-6}$ second level or even higher. One major disadvantage to using a sync wire is that it requires special hardware support. In addition, the required physical sync wire has extra cost and limits the distance among all synced devices.

Although the embodiments disclosed herein still allow devices to sync their clocks by sending messages over a network and without the use of a physical sync wire, the embodiments may also refine the resolution from the second level ($10^{-0}$ second) to the millisecond level ($10^{-3}$ second). There are a lot of devices that may benefit from this additional precision in their time synchronization. A few examples may include but are not limited to weapon simulators, robots, acquisition tracking and pointing systems or any other system that relies on real time events.

One advantage to the embodiments disclosed herein is that they may compensate for a clock drift on both the host 10 and the device 20. The apparatuses and methods may also compensate for drifts that are not constant. Drift rates may fluctuate from time to time because of effects from the environment or other known or unknown reasons. The embodiments disclosed herein may compensate for not only the various drifts but also a rate of change in the drifts.

Figure 3:
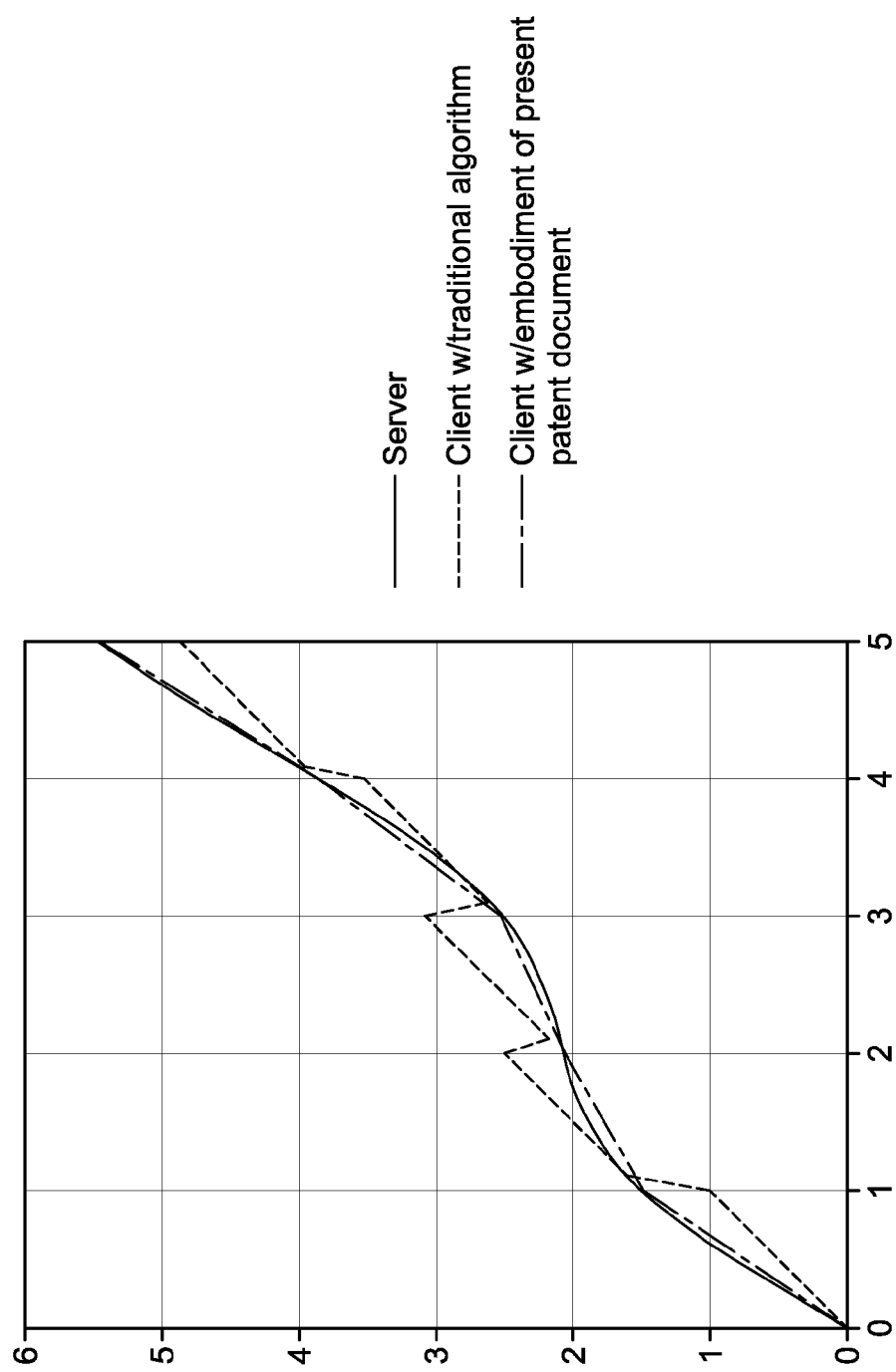
FIG. 3 illustrates a graph of the current time of a server timer and two client timers, one client timer using a traditional algorithm and one client timer using an embodiment as disclosed herein.

FIG. 3 illustrates the time sync results of a preferred embodiment of the present patent document. The charts X axis is absolute standard time. The charts Y axis is reported time from the server and the client. The blue line is the output of the server timer. Because there is drift in the server timer, its report time is not a 45 degree straight line. It is desirable to have the client timer synced with the server timer. Accordingly, the ideal synced client timer output should match the server timer curve. Assuming correction in the client side happens at each second (1 Hz), and assuming the client local timer has zero drift, the red line represents the client timer output after syncing with the server if using a traditional algorithm. The green line is client timer output if using one of the embodiments of the present patent document.

Although the embodiments have been described with reference to preferred configurations and specific examples, it will readily be appreciated by those skilled in the art that many modifications and adaptations of the systems and methods described herein are possible without departure from the spirit and scope of the embodiments as claimed hereinafter. Thus, it is to be clearly understood that this description is made only by way of example and not as a limitation on the scope of the embodiments.

What is claimed is:

1. A method of syncing a device clock over a communication network comprising:
   sending a plurality of sync requests over the communication network;
   for each sync request, storing in memory a sent host time $T_H0$ when the sync request was sent;

receiving from a local device a plurality of local time reports over the communication network;

for each local time report, storing in memory a receive host time $T_H3$ when the local time report was received;

calculating T such that $T=(T_H0+T_H3)/2$ for a plurality of sent host times and their corresponding receive host times;

for each local time report, storing in memory a device local time X extracted from the local time report; and calculating coefficients Ai and Bi using linear regression after calculating T from at least two host times and their corresponding receive host times where $X=Ai*T+Bi$.

2. The method of claim 1, further comprising the step of sending coefficients Ai and Bi to the local device.

3. The method of claim 1, further comprising the step of calculating a time on the local device from a host time by multiplying the host time by Ai and adding Bi.

4. The method of claim 1, further comprising the step of calculating a host time by taking a local device time and subtracting Bi and dividing the result by Ai.

5. The method of claim 1, wherein the device local time is measured in CPU ticks.

6. The method of claim 1, wherein the device local time is measured in seconds.

7. The method of claim 1, wherein the linear regression is least squares.

8. The method of claim 1, further comprising applying a filter to Ai and Bi to reduce the noise.

9. The method of claim 8, wherein the filter is a low pass filter.

10. A method of syncing a device clock over a communication network comprising:

a.) sending a sync requests over the communication network;

b.) storing in memory a sent host time $T_H0$ when the sync requests was sent;

c.) receiving a local time report over a communication network from a local device;

d.) storing in memory a device local time X extracted from the local time report;

e.) storing in memory a receive host time $T_H3$ when the local time report was received;

f.) calculating T such that $T=(T_H0+T_H3)/2$;

repeating steps a through f a plurality of times; and calculating coefficients Ai and Bi using linear regression after repeating steps a through f at least twice where $X=Ai*T+Bi$.

11. The method of claim 10, further comprising the step of sending coefficients Ai and Bi to the local device.

12. The method of claim 10, further comprising the step of calculating a time on the local device from a host time by multiplying the host time by Ai and adding Bi.

13. The method of claim 10, further comprising the step of calculating a host time by taking a local device time and subtracting Bi and dividing the result by Ai.

14. The method of claim 10, wherein the device local time is measured in CPU ticks.

15. The method of claim 10, wherein the device local time is measured in seconds.

16. The method of claim 10, wherein the linear regression is least squares.

17. The method of claim 10, further comprising applying a filter to Ai and Bi to reduce the noise.

18. The method of claim 17, wherein the filter is a low pass filter.

* * * * *